United States Patent
Yuergens et al.

[11] Patent Number: 5,655,635
[45] Date of Patent: Aug. 12, 1997

[54] TORSIONAL DAMPER FOR A TORQUE CONVERTER

[75] Inventors: Kenneth C. Yuergens, Farmington Hills; John P. Yanko, Shelby Township, both of Mich.

[73] Assignee: Borg-Warner Automotive, Inc., Sterling Heights, Mich.

[21] Appl. No.: 726,846

[22] Filed: Oct. 3, 1996

Related U.S. Application Data

[63] Continuation of Ser. No. 125,994, Sep. 23, 1993, abandoned.

[51] Int. Cl.⁶ .............................. F16D 3/14; F16D 47/02
[52] U.S. Cl. .................... 192/3.29; 192/212; 464/68
[58] Field of Search .................... 192/3.29, 3.28, 192/3.3, 212; 464/63, 64, 66, 68

[56] References Cited

U.S. PATENT DOCUMENTS

| | | | |
|---|---|---|---|
| 4,560,054 | 12/1985 | Kayanoki et al. | 192/106.2 |
| 4,613,029 | 9/1986 | Beccaris | 192/106.2 |
| 4,637,207 | 1/1987 | Gobel et al. | 192/3.28 |
| 4,668,207 | 5/1987 | Koshimo | 464/63 |
| 4,693,348 | 9/1987 | Tsukamoto et al. | 192/3.29 |
| 4,702,721 | 10/1987 | Lamarche | 192/106.2 X |
| 4,722,715 | 2/1988 | Billet et al. | 192/106.2 X |
| 4,726,185 | 2/1988 | Shigemasa et al. | 60/361 |
| 4,974,710 | 12/1990 | Murasugi | 192/3.3 |
| 4,974,715 | 12/1990 | Koyama | 192/3.29 |
| 5,042,632 | 8/1991 | Jäckel | 192/106.2 |
| 5,105,921 | 4/1992 | Fujimoto | 192/106.2 X |
| 5,141,474 | 8/1992 | Fujimoto | 192/106.2 X |
| 5,186,293 | 2/1993 | Fujimoto | 192/106.2 X |
| 5,203,835 | 4/1993 | Kohno et al. | 192/106.2 X |
| 5,205,389 | 4/1993 | Raab et al. | 192/106.2 |
| 5,209,330 | 5/1993 | MacDonald | 192/3.29 |
| 5,246,399 | 9/1993 | Yanko et al. | 192/106.2 X |
| 5,273,372 | 12/1993 | Friedmann et al. | 192/106.2 |
| 5,293,978 | 3/1994 | Reik et al. | 192/106.2 X |
| 5,301,780 | 4/1994 | Jäckel | 192/106.2 X |
| 5,377,796 | 1/1995 | Friedmann et al. | 192/3.29 |
| 5,407,041 | 4/1995 | Fukunaga et al. | |

*Primary Examiner*—Andrea L. Pitts
*Attorney, Agent, or Firm*—Reising, Ethington, et al.; Greg Dziegielewski

[57] ABSTRACT

A torque converter includes a subassembly that comprises a lock up clutch and a torsional damper. The torsional damper has an input plate that is part of the lock up clutch. Front and back sheet metal retainers are attached to the input plate to retain a plurality of torque transmitting springs. An outer castellated margin of an output plate is disposed between the front and back sheet metal retainers and engages the torque transmitting springs for being driven by the input plate via the sheet metal retainers. In one embodiment the plates are also connected by a lost motion drive connection that limits relative angular travel to protect the torque transmitting springs from being overloaded. In another embodiment two identical sheet metal retainers are flange driven to simplify construction further and conserve more space.

31 Claims, 5 Drawing Sheets

TORSIONAL DAMPER FOR A TORQUE CONVERTER

This application is a continuation of application Ser. No. 08/125,994, filed on Sep. 23, 1993, now abandoned.

BACKGROUND OF THE INVENTION

This invention relates to torsional dampers and more particularly to torsional dampers that have springs for transmitting torque from an input to an output.

SUMMARY OF THE INVENTION

The object of this invention is to provide a torsional damper that is compact, rugged and inexpensive to manufacture and that is particularly well suited for use in a torque converter that has a lock up clutch.

One feature of the invention is that the torsional damper is part of a unit handled subassembly that can be manufactured at one site and assembled into a more comprehensive assembly such as a torque converter at another site.

Another feature of the invention is that the torsional damper includes a sheet metal retainer that provides an annular enclosure for retaining the torque transmitting springs in the radial direction.

Still another feature of the invention is that the torsional damper has front and back sheet metal spring retainers that are connected to a drive plate that is part of a lock up clutch for a torque converter or the like.

Another feature of one embodiment of the invention is that the torsional damper has a sheet metal retainer that forms part of a piston for actuating a lock up clutch in a torque converter. This reduces cost and provides a more uniform pressure engaging the lock up clutch.

Still another feature of the one embodiment of the invention is that the torsional damper has front and back sheet metal retainers that are connected together so as to form a rigid box structure that accurately positions torque transmitting springs and reduces undesirable bending stresses in the springs.

Still yet another feature of the one embodiment of the invention is that the torsion damper has front and back sheet metal retainers and an input plate that are fastened together in such a manner so as to provide a lost motion drive connection to an output plate that limits angular travel and protects the torque transmitting springs from being overloaded.

Another feature of a second embodiment of the invention is that the torsional damper has front and back sheet metal retainers are driven by a flange of the pressure plate which results in an even more compact design particularly in the axial direction.

Still another feature of the second embodiment of the invention is that the torsional damper has front and back sheet metal retainers that are identical which results in a further simplification of the design and further economies in manufacture.

Still yet another feature of the second embodiment of the invention is that the torsional damper has bendable tabs that hold all of the components together without any need for rivets or other fasteners. This also simplifies assembly.

Still yet another feature of the second embodiment of the invention is that the torsional damper has front and back sheet metal retainers that are configured to set and maintain the clearance for the output plate.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
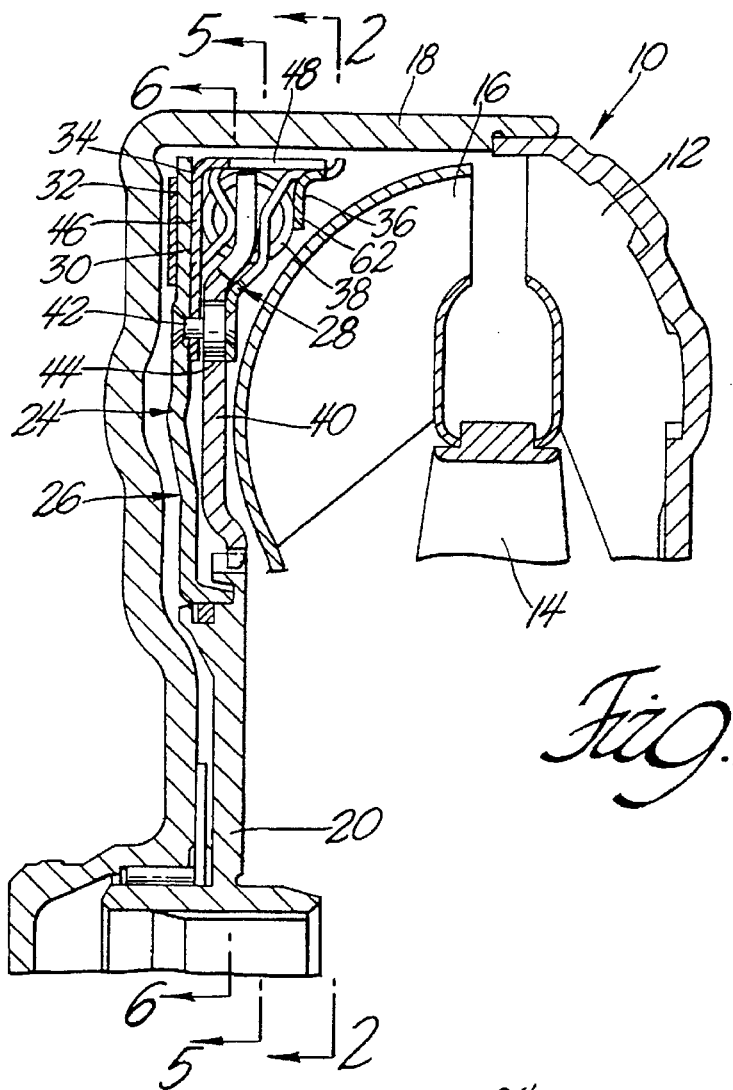
FIG. 1 is a longitudinal section of a torque converter equipped with a torsional damper in accordance with the invention.

Referring now to the drawing, a lock up torque converter 10 is illustrated that comprises an impeller 12, a stator or reactor 14 and a turbine 16 that are disposed in a housing 18.

The impeller 12 is driven by an engine (not shown) through the housing 18 that is attached to the periphery of the impeller 12. The turbine 16 is disposed in front of the impeller 12 that is drive connected to a turbine hub 20 connected to a drive shaft (not shown). The reactor 14 is stationary and it is disposed between the impeller 12 and the turbine 16 so that the impeller 12, turbine 16 and reactor 14 form a toroid for circulating hydraulic fluid in a closed loop in a well known manner.

The lock up-torque converter 10 further comprises a subassembly 24 that provides a lock up clutch 26 for driving the turbine hub 20 directly from the housing 18 at a one-to-one ratio and a torsional damper 28 for damping engine vibration when the turbine hub 20 is driven directly from the housing 18.

The subassembly 24 comprises a pressure plate 30 that has a inner flange that slides axially as well as circumferentially on a collar portion of the turbine hub 20 so that it moves toward and away from an end wall of the housing 18. The interface between the flange and the collar is sealed by a conventional piston ring type seal carried in a groove of the collar.

The pressure plate 30 carries an annular friction pad 32 at its outer margin. The operation of a lock up clutch in a torque converter is well known and need not be described in detail. Briefly, the friction pad 32 is pressed against the housing 18 when hydraulic pressure is applied to the pressure plate 30 so that the housing 18 drives the pressure plate 30 which in turn drives the turbine hub 20 through the torsional damper 28.

Figure 3:
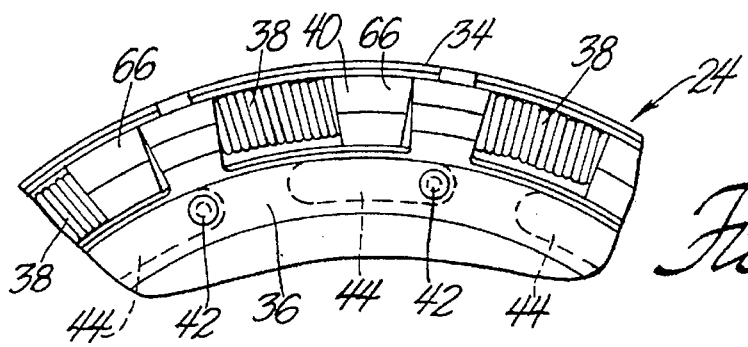
FIG. 3 is a section similar to FIG. 2 showing part of the torsional damper in a different operative position.

The torsional damper 28 comprises front and back sheet metal retainers 34 and 36 that retain a plurality of torque transmitting coil springs 38 circumferentially, radially and longitudinally. The front and back sheet metal retainers 34 and 36 are spaced apart so that an outer castellated margin of a drive plate 40 fits between the front and back retainers 34 and 36 as shown in FIG. 1. The drive plate 40 is drive connected to the drive hub 20 by splines or the like that allow the drive plate 40 to slide longitudinally with the pressure plate 30. The front and back retainers 34 and 36 are drive connected to the pressure plate 30 by rivet like drive pins 42. The drive pins 42 project through circumferential slots 44 in the drive plate 40. This pin and slot arrangement provides a lost motion drive connection that limits angular travel of the pressure plate 30 with respect to the drive plate 40. In other words the pressure plate 30 normally drives the drive plate 40 through the springs 38 until a maximum relative angular travel or displacement occurs and the drive pins 42 bottom out in the circumferential slots 44 as shown in FIG. 3. The pressure plate 30 then drives the drive plate 40 through the drive pins 42. This lost motion connection protects the springs 38 from being overloaded.

Figure 2:
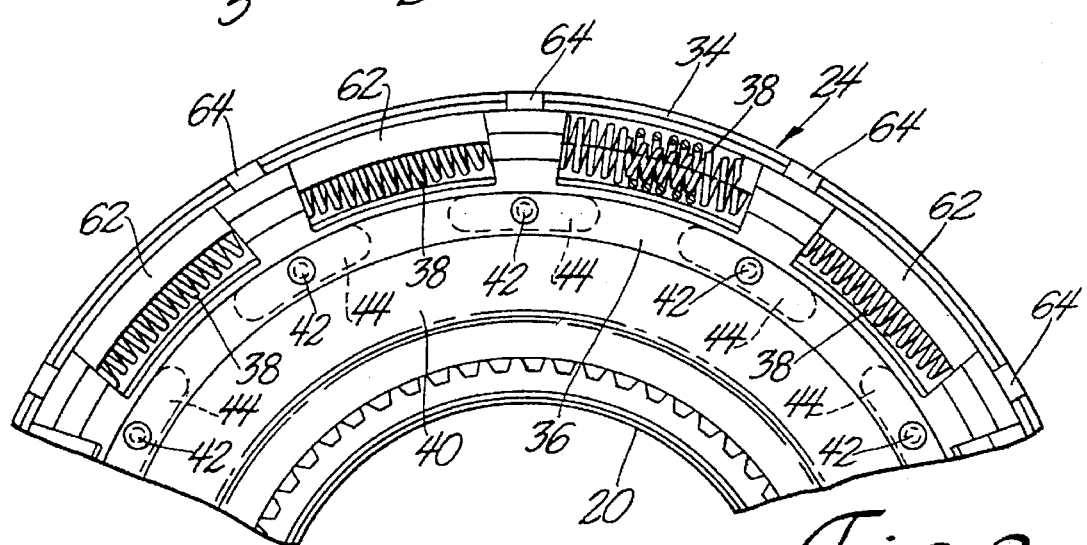
FIG. 2 is a section taken substantially along the line 2—2 of FIG. 1 looking in the direction of the arrows.
Figure 6:
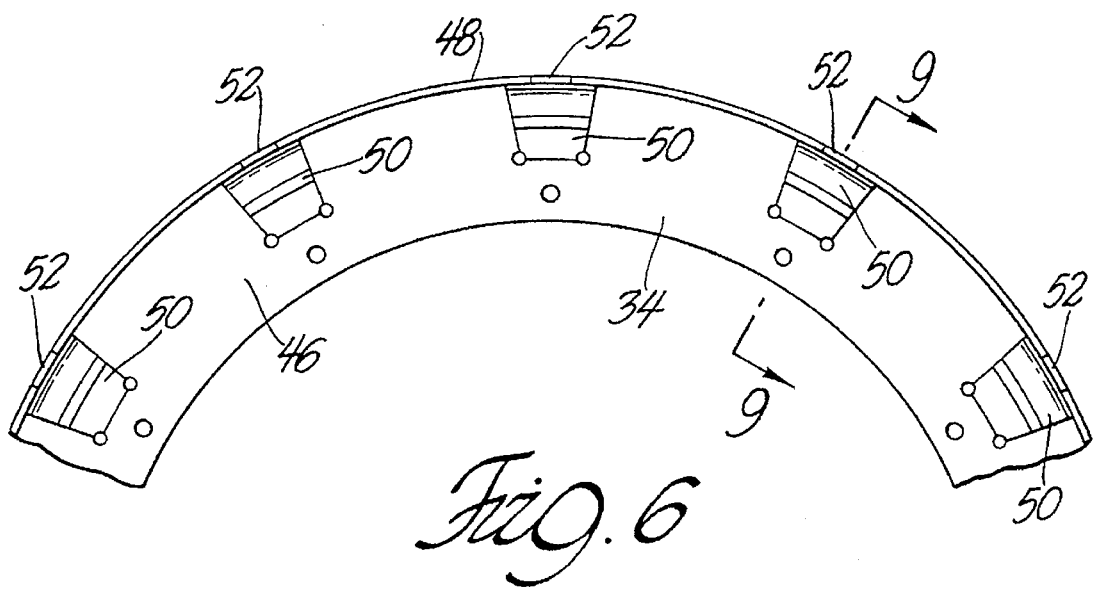
FIG. 6 is a section taken substantially along the line 6—6 of FIG. 1 looking in the direction of the arrows.
Figure 9:
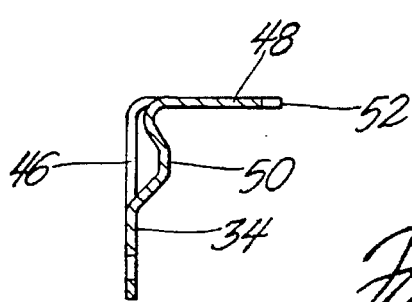
FIG. 9 is a section taken substantially along the line 9—9 of FIG. 6 looking in the direction of the arrows.

The front sheet metal retainer 34 which is also shown in FIGS. 6 and 9 is generally cup shaped comprising a back wall 46 and an outer flange 48. The back wall 46 and flange 48 are slit at several locations and formed to provide circumferentially spaced radial abutments 50 that are raised inside the cup, that is, that are displaced toward the free end of the flange 48 in the longitudinal direction. Each spring 38 is engaged by an abutment 50 at each end when the lock up clutch 26 is disengaged or the torsional damper 28 is not carrying torque as shown in FIGS. 1 and 2.

The free end of the flange 48 has a series of circumferentially spaced slots 52 in alignment with the abutments 50.

Figure 4:
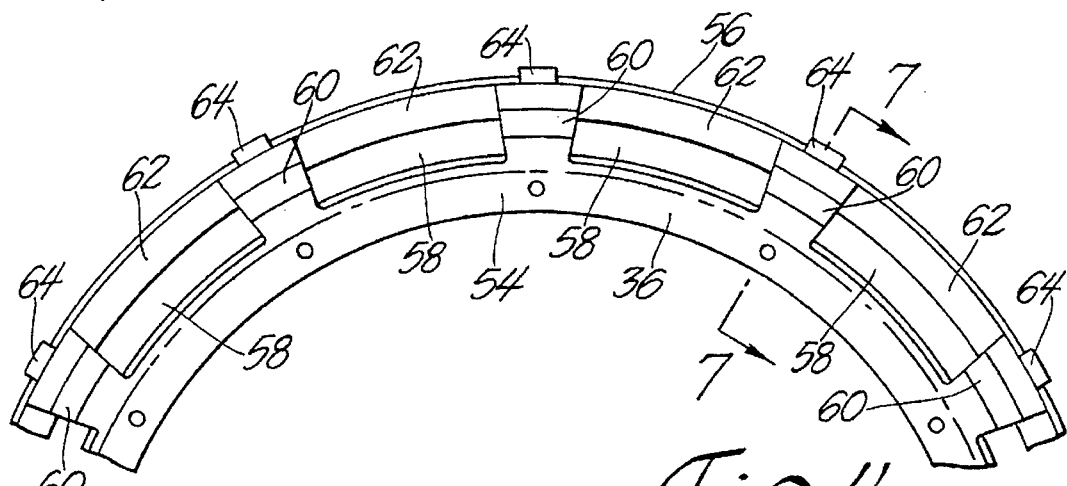
FIG. 4 is plan view of the right hand retainer that is shown in FIG. 1.
Figure 7:
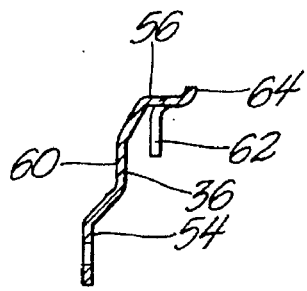
FIG. 7 is a section taken substantially along the line 7—7 of FIG. 4 looking in the direction of the arrows.

The back sheet metal retainer 36 which is also shown in FIGS. 4 and 7 is also generally cup shaped as shown in FIG. 7 and nests in the front sheet metal retainer 34 as shown in FIG. 1. The back retainer 36 comprises a back wall 54 and an outer flange 56 that are punched, slit and formed to provide a series of windows 58 in the back wall 54 that are separated by circumferentially spaced radial abutments 60 that are raised inside the cup, that is, that are displaced toward the free end of the flange 56 in the longitudinal direction. When the back retainer is formed, part of the material originally in the windows 58 is retained and bent inwardly to provide depending spring holders 62 integrally attached to the outer flange 56. Each spring 38 is disposed in one of the windows 58 and engaged by an abutment 60 at each end when torsional damper 28 is no carrying torque. Each spring 38 is also retained in the its window 58 by one of the depending spring holders 62 and the back wall 46 of the front retainer 34. The springs 38 are retained in the radial direction by the annular flange 48.

The free end of the flange 56 of the back retainer 36 has a series of small, circumferentially spaced tabs 64 in alignment with the abutments 60 as shown in FIG. 4. The tabs 64 fit into the slots 52 in the flange 48 of the front retainer 34 to locate the front and back retainers 34 and 36 with respect to each other when the retainers 34 and 36 are fastened together.

Figure 5:
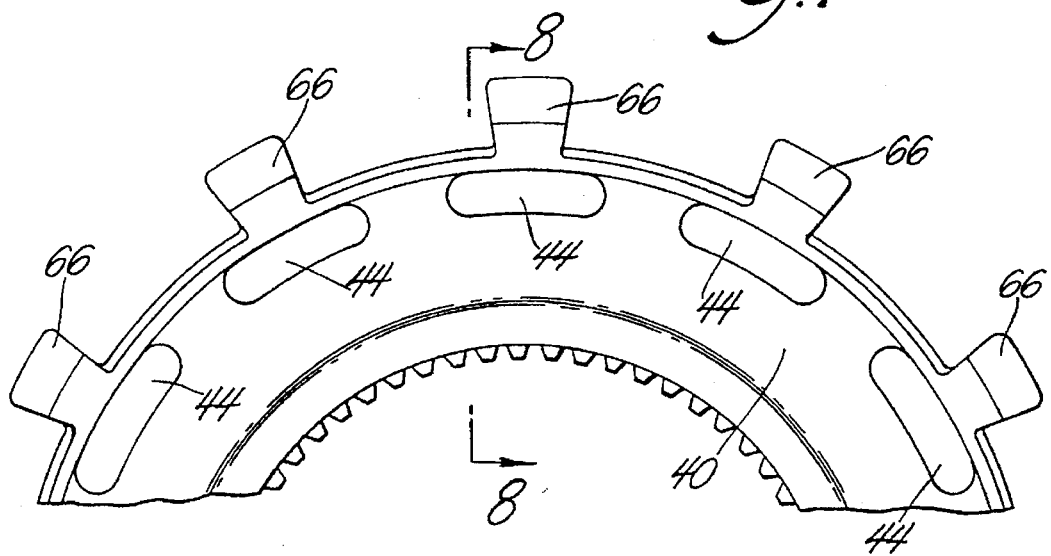
FIG. 5 is a section taken substantially along the line 5—5 of FIG. 1 looking in the direction of the arrows.
Figure 8:
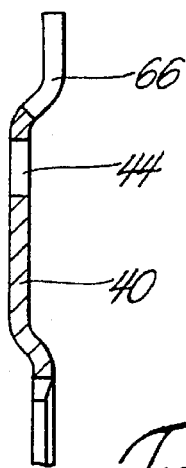
FIG. 8 is a section taken substantially along the line 8—8 of FIG. 5 looking in the direction of the arrows.

The drive plate 40 is also shown in FIGS. 5 and 8. As indicated earlier the outer margin of the drive plate 40 is castellated. This provides a series of circumferentially spaced teeth 66 as shown in FIG. 5 that fit between the front and back sheet metal retainers 34 and 36 as shown in FIG. 1. The planform shape of the teeth 66, the abutments 50 of the front retainer 34 and the abutments 60 of the back retainer 36 are substantially identical. Thus each spring 38 is engaged by teeth 66, front abutments 50 and back abutments 60 at each end when the torsional damper is not transmitting torque. Each spring 38 is preferably prestressed slightly under these conditions.

The subassembly 24 is unitized by fastening the sheet metal retainers 34 and 36 to the plate 30 with the rivet-like drive pins 42 and by fastening the sheet metal retainers 34 and 36 together at their outer margin in any suitable manner. The simplest way is to deform material in one or both retainers to form a clinch joint that holds the tabs 64 in the slots 52. A preferred way is to laser beam weld the sheet metal retainers 34 together at the interfaces of the locating tabs 64 and the slots 52. This unitized subassembly 24 is then incorporated in the torque converter simply by mounting the pressure plate 30 and the drive plate 40 on the collar and drive splines of the turbine hub 20.

Besides being unitized as a subassembly 24, the lock up clutch 26 and torsion damper 28 are very compact and configured so the subassembly 24 fits in the outer corner of the housing 18 with the springs 38 and sheet metal retainers 34 and 36 being located outwardly of the widest part of the turbine 16 as shown in FIG. 1.

During operation of the torque converter, the springs 38 are held against outward movement and the effects of centrifugal force by the flange 48 of the front sheet metal retainer 34 that forms an annular enclosure for the springs 38. This flange 48 also provides an annular skirt for the pressure plate 30 so that it acts like a piston in the housing 18. The use of the sheet metal flange 48 as the piston skirt reduces manufacturing cost and also results in a piston that is more compliant to applied hydraulic pressure. This provides a more uniform applied pressure biasing the annular friction pad 32 into engagement with the housing 18 to engage the lock up clutch 26.

When the lock up clutch 26 is engaged, the pressure plate 30 becomes an input member for the torsional damper 26 and the drive plate 40 becomes the output member. The plate 30 drives the retainer 34 and 36 which in turn drive the springs 38 at one end as shown in FIG. 3. The springs 38 then drive the plate 40 through the teeth 66. Torque transmission through the coil springs 38 dampens engine vibration as is well known.

Figure 10:
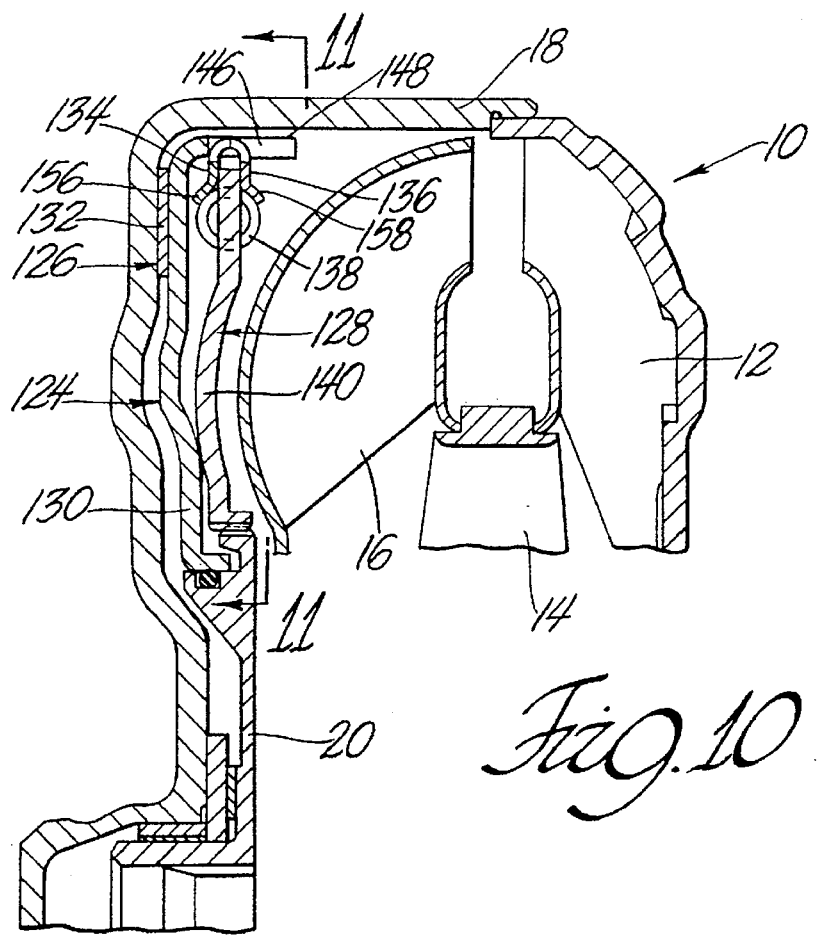
FIG. 10 is a longitudinal section of a torque converter equipped with a torsional damper in accordance with a second embodiment of the invention.

Referring now to FIGS. 10–17 of the drawings and more particularly to FIG. 10, a second embodiment of my invention is illustrated in conjunction with the lock up torque converter 10 comprising the impeller 12, the stator or reactor 14 and the turbine 16 that are disposed in the housing 18.

The lock up-torque converter 10 further comprises a modified subassembly 124 that provides a lock up clutch 126 for driving the turbine hub 20 directly from the housing 18 at a one-to-one ratio and a modified torsional damper 128 for damping engine vibration when the turbine hub 20 is driven directly from the housing 18.

The subassembly 124 comprises a pressure plate 130 that has a inner flange that slides axially as well as circumferentially on a collar portion of the turbine hub 20 so that it moves toward and away from an end wall of the housing 18. The interface between the flange and the collar is sealed by a conventional piston ring type seal carried in a groove of the collar.

Figure 14:
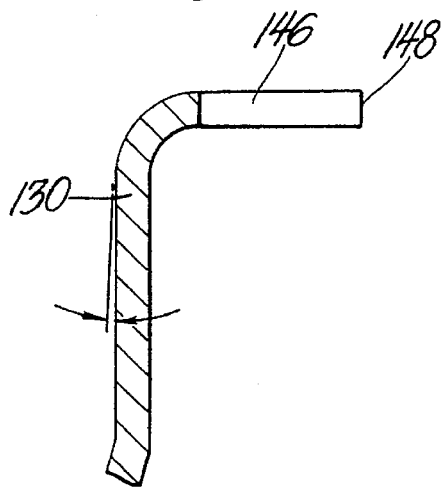
FIG. 14 is an enlargement of the circled portion of FIG. 10.

The pressure plate 130 engages a loose annular friction pad 132 at its outer margin. The pressure plate 130 is slightly dished (about 0.6 degree) as shown in FIG. 14 so that the pressure plate 130 engages the outer margin of the annular friction pad 132 first and than folds into total engagement. Otherwise the operation of the lock up clutch 126 in a torque converter is well known and need not be described in any great detail. Briefly, the friction pad 132 is pressed against the housing 18 when hydraulic pressure is applied to the pressure plate 130 so that the housing 18 drives the pressure plate 130 which in turn drives the turbine hub 20 through the torsional damper 128.

Figure 11:
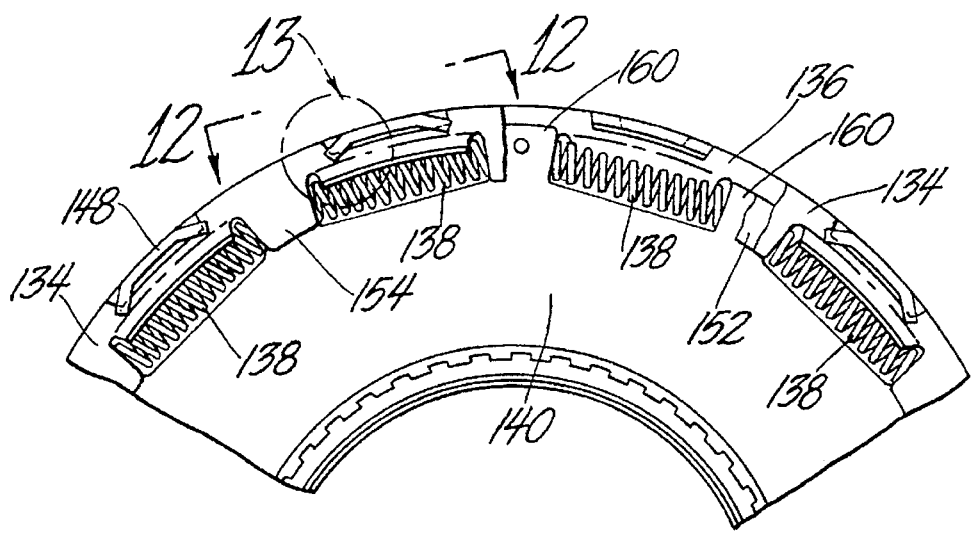
FIG. 11 is a section taken substantially along the line 11—11 of FIG. 10 looking in the direction of the arrows.
Figure 16:
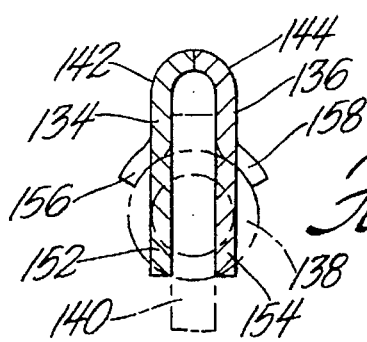
FIG. 16 is a section taken substantially along the line 16—16 of FIG. 15 looking in the direction of the arrows.

The torsional damper 128 comprises identical front and back sheet metal retainers 134 and 136 that retain a plurality of torque transmitting coil springs 138 circumferentially, radially and longitudinally. The front and back sheet retainers 134 and 136 are shaped to provide a space for receiving an outer castellated margin of a drive plate 140 as shown in FIGS. 10, 11 and 16. The drive plate 140 is drive connected to the drive hub 20 by splines or the like that allow the drive plate 140 to slide longitudinally with the pressure plate 130.

The front and back retainers 134 and 136 are drive connected to the pressure plate 130 by matching sets of circumferentially spaced ears 142 and 144 that form an integral part of the respective retainers 134 and 136. The ears 142 and 144 are curled at their outer ends. These outer ends abut each other when the identical retainers 134 and 136 are placed back to back to provide and maintain the proper space for receiving the outer castellated margin of the drive plate 140 with a running fit as best shown in FIGS. 10 and 16.

Figure 12:
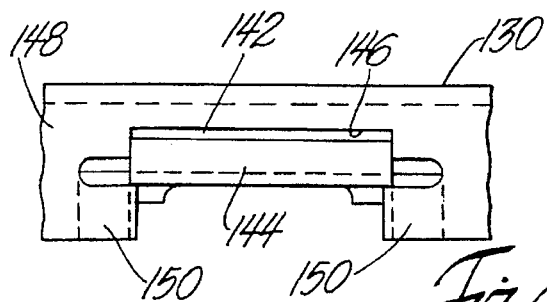
FIG. 12 is a top view taken substantially along the line 12—12 of FIG. 11 looking in the direction of the arrows.
Figure 17:
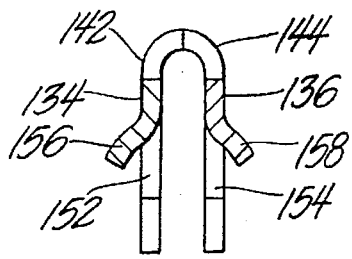
FIG. 17 is a section taken substantially along the line 17—17 of FIG. 15 looking in the direction of the arrows.
Figure 13:
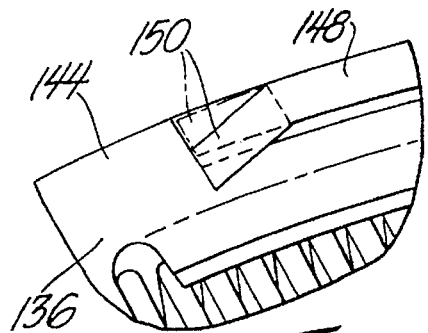
FIG. 13 is an enlargement of the circled portion of FIG. 11.

The abutting sets of curled ears 142 and 144 are disposed in a matching set of circumferential drive slots 146 in an outer flange 148 of the pressure plate 130 as best shown in FIGS. 10 and 12. The abutting sets of ears 142 and 144 are retained in the respective drive slots 146 by bendable tabs 150 located at each outboard end of each slot 146, that is, at the free end of the flange 148. These tabs 150 are bent radially inwardly from the phantom line position shown in FIG. 13 to the solid line position after the abutting sets of ears 142 and 144 are inserted into the respective drive slots 146. This arrangement provides a drive connection from the pressure plate 130 to the retainers 134 and 136. The bent tabs 150 also hold the pressure plate 130, retainers 134 and 136, springs 138 and drive plate 140 together in a unit handled sub-assembly with no need for rivets or other fasteners.

Figure 15:
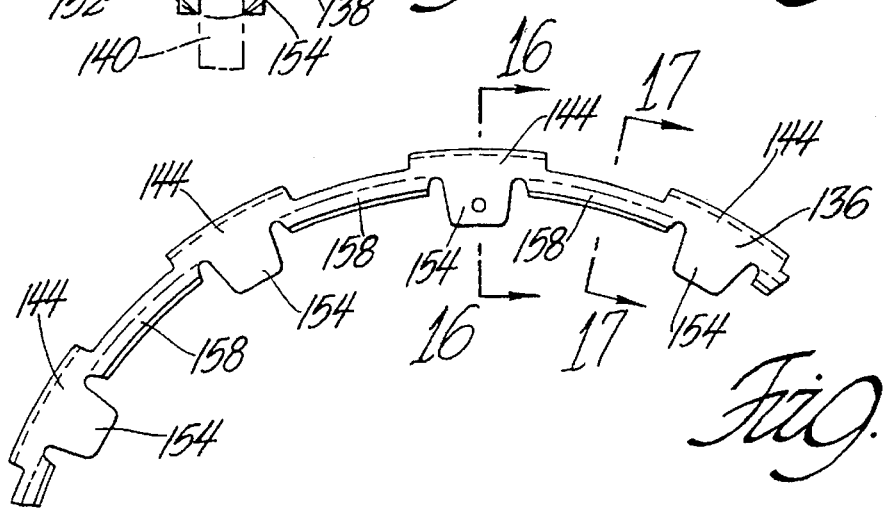
FIG. 15 is a fragmentary front view of one of the retainers shown in FIG. 10.

The sheet metal retainers 134 and 136 are formed so that each has a matching set of circumferentially spaced inner radial abutments 152 and 154 respectively that are aligned with the respective sets of ears 142 and 144 as best seen in FIGS. 11, 15 and 16. Each spring 138 is engaged by an abutment 152 and an abutment 154 at each end when the lock up clutch 126 is disengaged or the torsional damper 128 is not carrying torque as shown in FIGS. 10 and 11.

The sheet metal retainers 134 and 136 are also formed so that each has a matching set of curved depending spring holders 156 and 158 respectively that are integrally attached and interdigitated with the respective inner radial abutments 152 and 154 as best shown in FIGS. 11 and 15. Each spring 138 is engaged on one side by one of the spring holders 156 and on an opposite side by one of the spring holders 158 as best shown in FIG. 10. Thus the spring holders 156 and 158 retain the springs 138 in the axial or longitudinal direction as well as the radial direction.

The drive plate 140 which is best shown in FIGS. 10 and 11 has an outer margin that is castellated as indicated earlier. This provides a series of circumferentially spaced teeth 160 as shown in FIG. 11 that fit between the front and back sheet metal retainers 134 and 136 as shown in FIG. 10. As shown in FIG. 11, the shape or radial outline of the teeth 160, the abutments 152 of the front retainer 134 and the abutments 154 of the back retainer 136 are substantially identical. Thus each spring 138 is engaged by teeth 160, front abutments 152 and back abutments 154 at each end when the torsional damper is not transmitting torque. Each spring 138 is preferably prestressed slightly under these conditions.

As indicated earlier the subassembly 124 is unitized by fastening the sheet metal retainers 134 and 136 in the drive slots of the pressure plate 130 by bending the tabs 150 inwardly. This unitized subassembly 124 is then incorporated in the torque converter simply by mounting the pressure plate 130 and the drive plate 140 on the collar and drive splines of the turbine hub 20.

Besides being unitized as a subassembly 124, the lock up clutch 126 and torsion damper 128 are very compact and configured so the subassembly 124 fits in the outer corner of the housing 18 with the springs 138 and sheet metal retainers 134 and 136 being located outwardly of the widest part of the turbine 16 as shown in FIG. 10. This second embodiment is even more compact that the first embodiment described in connection with FIGS. 1–9, particularly in the longitudinal or axial direction. This compactness or thinness in the axial direction is due primarily to the flange drive of the sheet metal retainers 134 and 136 and the termination of the sheet metal retainers 134 and 136 at the inner ends of the drive abutments 152 and 154.

When the lock up clutch 126 is engaged, the pressure plate 130 becomes an input member for the torsional damper 126 and the drive plate 140 becomes the output member. The plate 130 drives the retainers 134 and 136 via flange 148. The retainers 135 and 136 in turn drive the springs 138 at one end via abutments 152 and 154. The springs 138 then drive the plate 140 through the teeth 160. Torque transmission through the coil springs 138 dampens engine vibration as is well known.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A unit handled subassembly for a torque converter having a turbine driving a turbine hub, a lock up clutch and a torsional damper disposed in a housing, the unit handled subassembly comprising:

a pressure plate forming part of a lock up clutch;

a front annular sheet metal retainer;

a back annular sheet metal retainer;

the front and back annular sheet metal retainers being attached to the pressure plate and retaining a plurality of torque transmitting springs circumferentially, radially and longitudinally;

a drive plate having an outer castellated margin that is disposed between axially spaced portions of the front and back sheet metal retainers and engages the torque transmitting springs for receiving torque from the pressure plate; and the lock up clutch and torsional damper being configured so that the subassembly fits in an outer corner of a housing for a torque converter with the torque transmitting springs and sheet metal retainers located outwardly of the widest part of a turbine disposed in the housing.

2. The unit handled subassembly as defined in claim 1 wherein the pressure plate engages an annular friction pad and slides and rotates on a collar portion of a turbine hub so that it moves toward and away from an end wall of the housing and the drive plate is drive connected to the turbine hub so as to slide relative to the drive hub.

3. The unit handled subassembly as defined in claim 1 wherein;

the front sheet metal retainer is generally cup shaped and includes a back wall and an outer flange that are formed to provide circumferentially spaced radial abutments that engage ends of the springs;

the back sheet metal retainer is generally cup shaped and nests in the front sheet metal retainer, the back retainer includes a back wall and an outer flange that are formed to provide a series of windows in the back wall that receive the springs and that are separated by circumferentially spaced radial abutments that engage ends of the springs, and the outer flange has depending spring holders retaining the springs in the windows.

4. The unit handled subassembly as defined in claim 3 wherein the castellated outer margin of the pressure plate provides a series of circumferentially spaced teeth and wherein the teeth, the abutments of the front retainer and the abutments of the back retainer have planform shapes that are substantially identical.

5. The unit handled subassembly as defined in claim 3 wherein a lost motion drive connection fastens the retainers to the pressure plate and limits relative angular travel of the plates with respect to each other; and the retainers are fastened together at the flanges to form a rigid box structure.

6. The unit handled subassembly as defined in claim 5 wherein the front and back retainers are drive connected to the pressure plate by rivet like drive pins that project through circumferential slots in the drive plate to provide the lost motion connection.

7. The unit handled subassembly as defined in claim 1 wherein the front sheet metal retainer and the back sheet metal retainer are identical.

8. The unit handled subassembly as defined in claim 1 wherein the front sheet metal retainer is generally cup shaped and includes a back wall and an outer flange that are formed to provide the circumferentially spaced radial abutments that engage ends of the torque transmitting springs.

9. The unit handled subassembly as defined in claim 8 wherein the back sheet metal retainer is generally cup shaped and includes a back wall and an outer flange that are formed to provide a series of windows in the back wall that receive the torque transmitting springs and that are separated by circumferentially spaced radial abutments that engage the ends of the torque transmitting springs, and wherein the outer flange has depending spring holders retaining the springs in the windows.

10. The unit handled subassembly as defined in claim 9 wherein the back retainer nests in the front retainer and the retainers are fastened to the pressure plate and are fastened together at the outer flanges.

11. The unit handled subassembly as defined in claim 1 wherein the assembly of plates, retainers and springs is unitized by fastening the retainers to the pressure plate with rivet-like drive pins and by fastening the sheet metal retainers together at their outer margin to form a box structure.

12. The unit handled subassembly as defined in claim 1 wherein the front sheet metal retainer has an annular flange that provides an annular skirt for the pressure plate so that it acts like a piston when the unit handled subassembly is assembled into a housing.

13. The unit handled subassembly as defined in claim 1 further including a lost motion drive connection that limits relative angular travel of the plates with respect to each other.

14. A unit handled subassembly for a torque converter having a turbine driving a turbine hub, a lock up clutch and a torsional damper disposed in a housing, the unit handled subassembly comprising: a pressure plate forming part of a lock up clutch; front and back sheet metal retainers that are attached to the pressure plate and that retain a plurality of torque transmitting springs circumferentially, radially and longitudinally; a drive plate having an outer castellated margin that is disposed between the front and back sheet metal retainers and engages the torque transmitting springs for receiving torque from the pressure plate; the lock up clutch and torsional damper being configured so that the subassembly fits in an outer corner of a housing for a torque converter with the torque transmitting springs and sheet metal retainers located outwardly of the widest part of a turbine disposed in the housing, and the front and back sheet metal retainers being formed with matching sets of circumferentially spaced ears, the ears being curled at their outer ends, and the outer ends abutting each other to provide and maintain the proper space for receiving an outer castellated margin of the drive plate with a running fit.

15. The torsional damper as defined in claim 14 wherein the abutting sets of curled ears are disposed in a matching set of circumferential drive slots in an outer flange of the drive plate to provide a drive connection from the pressure plate to the retainers.

16. The torsional damper as defined in claim 15 wherein the abutting sets of ears are retained in the respective drive slots by bendable tabs that hold the pressure plate, retainers, springs and drive plate together in a unit handled subassembly with no need for rivets or other fasteners.

17. The torsional damper as defined in claim 16 wherein the sheet metal retainers are formed so that each has a matching set of circumferentially spaced inner radial abutments respectively that are aligned with the respective sets of ears.

18. The torsional damper as defined in claim 17 wherein the sheet metal retainers are formed so that each has a matching set of curved depending spring holders that are integrally attached and interdigitated with the respective inner radial abutments and wherein each spring is engaged on one side by one of the spring holders of the front sheet metal retainer and on an opposite side by one of the spring holders of the back sheet metal retainer.

19. The torsional damper as defined in claim 17 wherein the sheet metal retainers terminate at the inner ends of the inner radial abutments to conserve space in the axial direction.

20. A torsional damper comprising:

a first plate;

a front annular sheet metal retainer;

a back annular sheet metal retainer;

the front and back annular sheet metal retainers being attached to the first plate and retaining a plurality of torque transmitting springs circumferentially, radially and longitudinally; and a second plate having an outer castellated margin that is disposed between axially spaced portions of the front and back sheet metal retainers and that is engaged by the torque transmitting springs;

the front sheet metal retainer and the back sheet metal retainer being identical, and the front sheet metal retainer and the back sheet metal retainer having portions abutting each other to locate the axially spaced portions of the front and back sheet metal retainers.

21. A torsional damper comprising a first plate; front and back sheet metal retainers that are attached to the first plate and that retain a plurality of torque transmitting springs circumferentially, radially and longitudinally; and a second plate having an outer castellated margin that is disposed between the front and back sheet metal retainers and that is engaged by the torque transmitting springs, the front and back sheet metal retainers being formed with matching sets of circumferentially spaced ears, the ears being curled at their outer ends, and the outer ends abutting each other to provide and maintain the proper space for receiving the outer castellated margin of the second plate with a running fit.

22. The torsional damper as defined in claim 21 wherein the abutting sets of curled ears are disposed in a matching set of circumferential drive slots in an outer flange of the first plate to provide a drive connection from the first plate to the retainers.

23. The torsional damper as defined in claim 22 wherein the abutting sets of ears are retained in the respective drive slots by bendable tabs that hold the plates, retainers and springs together in a unit handled subassembly with no need for rivets or other fasteners.

24. The torsional damper as defined in claim 22 wherein the sheet metal retainers are formed so that each has a matching set of circumferentially spaced inner radial abutments respectively that are aligned with the respective sets of ears and that engage ends of the torque transmitting springs.

25. The torsional damper as defined in claim 24 wherein the sheet metal retainers terminate at the inner ends of the inner radial abutments to conserve space in the axial direction.

26. The torsional damper as defined in claim 22 wherein the sheet metal retainers are formed so that each has a matching set of curved depending spring holders that are integrally attached and wherein each spring is engaged on one side by one of the spring holders of the front sheet metal retainer and on an opposite side by one of the spring holders of the back sheet metal retainer.

27. A torsional damper comprising:

a first plate;

a front annular sheet metal retainer;

a back annular sheet metal retainer;

the front and back annular sheet metal retainers being drive connected to the first plate and retaining a plurality of torque transmitting springs circumferentially, radially and longitudinally; and a second plate having an outer margin that is disposed between axially spaced portions of the front and back sheet metal retainers and that is engaged by the torque transmitting springs;

the front sheet metal retainer and the back sheet metal retainer being identical, and the front sheet metal retainer and the back sheet metal retainer having portions abutting each other to locate the axially spaced portions of the front and back sheet metal retainers.

28. The torsional damper as defined in claim 27 wherein the front and back annular sheet metal retainers are retained by the first plate.

29. The torsional damper as defined in claim 27 wherein the portions abutting each other are radially outward of the axially spaced portions of the front and back sheet metal retainers.

30. A torsional damper comprising:

a first plate;

a front annular sheet metal retainer;

a back annular sheet metal retainer;

the front and back annular sheet metal retainers retaining a plurality of torque transmitting springs circumferentially, radially and longitudinally; and a second plate having an outer margin that is disposed between axially spaced portions of the front and back sheet metal retainers and that is engaged by the torque transmitting springs;

the front sheet metal retainer and the back sheet metal retainer being identical, and being attached to one of the aforesaid plates, and the front sheet metal retainer and the back sheet metal retainer having portions abutting each other to locate the axially spaced portions of the front and back sheet metal retainers.

31. The torsional damper as defined in claim 30 wherein the portions abutting each other are radially outward of the axially spaced portions of the front and back sheet metal retainers.

* * * * *